United States Patent
Kuromitsu et al.

[19]

[11] Patent Number: 6,065,279
[45] Date of Patent: May 23, 2000

[54] MASTER CYLINDER

[75] Inventors: Hiromu Kuromitsu; Toshihiro Nakano, both of Chiryu; Hideaki Iijima, Kariya, all of Japan

[73] Assignee: Aisin Seiki Kabushiki Kaisha, Kariya, Japan

[21] Appl. No.: 09/114,243

[22] Filed: Jun. 26, 1998

[30] Foreign Application Priority Data

Jun. 27, 1997 [JP] Japan ................................. 9-172494

[51] Int. Cl.$^7$ .............................. B60T 11/26; F15B 7/08
[52] U.S. Cl. .................... 60/5; 588/60; 588/589
[58] Field of Search .......................... 60/586, 588, 589, 60/591, 592

[56] References Cited

U.S. PATENT DOCUMENTS

| | | | |
|---|---|---|---|
| 1,701,297 | 2/1929 | Custenborder | 60/588 |
| 2,396,155 | 3/1946 | Christensen | 60/588 |
| 2,909,036 | 10/1959 | Dubonnet | 60/588 |
| 3,214,913 | 11/1965 | Hayman et al. | 60/534 |
| 5,542,253 | 8/1996 | Ganzel | 60/588 X |
| 5,544,485 | 8/1996 | Nakano et al. | 60/589 |
| 5,611,367 | 3/1997 | Young | 60/591 X |

FOREIGN PATENT DOCUMENTS 57-51552  3/1982  Japan ........................... 50/586

*Primary Examiner*—John E. Ryznic
*Attorney, Agent, or Firm*—Burns, Doane, Swecker & Mathis, LLP

[57] ABSTRACT

In a master cylinder for drawing brake fluid from a reservoir through a pressure generating chamber in the master cylinder during fluid pressure control to supply brake pressure to a wheel cylinder, a check valve is provided for securing sufficient suction from the master cylinder. The check valve is operational to communicate the supply chamber and the pressure generating chamber with each other only when the pressure generating chamber is under a negative pressure while the piston is in a non-operating position. The check valve is arranged within the inner portion of the piston and along the axis of the piston.

19 Claims, 5 Drawing Sheets

MASTER CYLINDER

This application corresponds to and claims priority under 35 U.S.C. § 119 with respect to Japanese Application No. 09(1997)-172494 filed on Jun. 27, 1997, the entire content of which is incorporated herein by reference.

FIELD OF THE INVENTION

The present invention generally relates to a master cylinder for use in a vehicle. More particularly, the present invention pertains to a master cylinder for use in a vehicle is able to perform traction control by drawing brake fluid from a reservoir upon the occurrence of a slip condition to supply brake pressure to a wheel cylinder.

BACKGROUND OF THE INVENTION

It has been proposed in the past to design a vehicle so that when the accelerator pedal is excessively stepped on or depressed so as to result in wheel slippage, brake fluid is sucked or drawn from a reservoir through a fluid passage or a communicating hole within the master cylinder in accordance with a brake pressure control such as a TRC control (a traction control). In this way the wheel cylinder pressure in the wheel is controlled. For this reason, a pump provided in the output port end of the master cylinder is driven so that the brake fluid is drawn from the reservoir and is guided to the wheel cylinder. However, in situations where a lot of brake fluid is supplied to the wheel cylinder at a time of starting the traction control, the flow passage for the brake fluid forms a resistance with respect to the amount of discharge of the pump and so it is difficult to draw out the required amount of fluid. There thus arises the possibility that an insufficient amount of brake pressure will be supplied to the wheel cylinder.

In an attempt to address this problem, it has been proposed, for example in EP 550710, to provide a bypass passage in a portion joining a reservoir connecting port of the master cylinder to a pressure generating chamber within the master cylinder and a check valve, with the check valve being located in the middle of the bypass passage for permitting flow from the reservoir to the pressure generating chamber while preventing flow in the opposite direction. This is illustrated in FIG. 5.

However, in this system in which the bypass passage is provided within the master cylinder for feeding a sufficient amount of brake fluid to the wheel cylinder and the check valve is provided in the middle of the bypass passage, the space required for arranging the bypass passage and the check valve within the master cylinder is somewhat problematic.

A need thus exists for a master cylinder which addresses the foregoing drawbacks and disadvantages.

It would be desirable to provide a master cylinder for drawing brake fluid from a reservoir through a pressure generating chamber of the master cylinder at a time of controlling fluid pressure to supply brake pressure to the wheel cylinder of a wheel, wherein the check valve is easily arranged while at the same time ensuring that sufficient suction can be secured from the master cylinder.

SUMMARY OF THE INVENTION

According to one aspect of the invention, a master cylinder includes a piston disposed in a cylindrical bore formed in a body for moving in forward and rearward directions, and a pressure generating chamber and a supply chamber formed in the body, with the pressure generating chamber communicating with an output port and the supply chamber communicating with a reservoir storing brake fluid. The piston discharges brake fluid of increased pressure in the pressure generating chamber to the output port upon operation of the piston, with the piston being returned to a non-operating position by a return spring arranged within the pressure generating chamber. The piston has an opening that communicates the supply chamber with the pressure generating chamber. A rod is positioned within the opening and the rod includes an axially extending hole. The supply chamber and the pressure generating chamber are communicated by a flow passage formed between the inner periphery of the opening in the piston and the outer periphery of the rod when the piston is positioned in the non-operating position. The flow passage is closed by a seal member that is arranged on the outer periphery of the rod when the piston moves a predetermined distance. A check valve is positioned within the piston along the axis of the piston for communicating the supply chamber with the pressure generating chamber only when the piston is in the non-operating position and the pressure generating chamber is under negative pressure.

By virtue of the construction of the master cylinder in accordance with the present invention, because the check valve is designed to communicate the supply chamber with the pressure generating chamber when the piston is in the nonoperating state and the pressure generating chamber is under negative pressure, the brake fluid in the reservoir can be easily sucked or drawn from the check valve when brake fluid is required during fluid pressure control. Because the check valve is provided in the inner portion of the piston and along the axis of the cylindrical body, advantageous use is made of space. The size of the master cylinder thus need not be increased and the cost can be maintained.

According to another aspect of the invention, a master cylinder includes a body having a bore in which is positioned an axially movable piston to form a pressure generating chamber on one side of the piston and a supply chamber on an opposite side of piston, with the pressure generating chamber being in communication with an output port formed in the body and the supply chamber being in communication with a reservoir storing brake fluid. A return spring is operatively associated with the piston for applying an urging force to the piston for normally urging the piston to a non-operating position. The piston is axially movable against the normal urging force of the return spring to an operating position in which brake fluid of increased pressure in the pressure generating chamber is output to the output port. A check valve is positioned within the piston for permitting communication between the supply chamber and the pressure generating chamber only when the piston is in the non-operating position and the pressure generating chamber is under negative pressure.

In accordance with a further aspect of the present invention, a master cylinder includes a body having a bore in which is positioned an axially movable piston to form a pressure generating chamber on one side of the piston and a supply chamber on an opposite side of piston, with the pressure generating chamber being in communication with an output port formed in the body and the supply chamber being in communication with a reservoir storing brake fluid. A return spring is operatively associated with the piston for applying an urging force to the piston for normally urging the piston to a non-operating position, with the piston being axially movable against the normal urging force of the return spring to an operating position in which brake fluid of increased pressure in the pressure generating chamber is output to the output port. An axially movable rod is positioned within the piston and is provided with an axially extending hole. A flow passage is provided for communicating the pressure generating chamber with the supply chamber when the piston is in the non-operating position, and an axially movable valve body is positioned within the piston. A spring member normally urges the valve body towards the rod to close the hole in the rod. The valve body is movable away from the rod to open the hole in the rod and permit communication between the supply chamber and the pressure generating chamber by way of the hole in the rod only when the piston is in the non-operating position and the pressure generating chamber is under negative pressure.

BRIEF DESCRIPTION OF THE DRAWING FIGURES

DETAILED DESCRIPTION OF THE PREFERRED EMBODIMENTS

Figure 1:
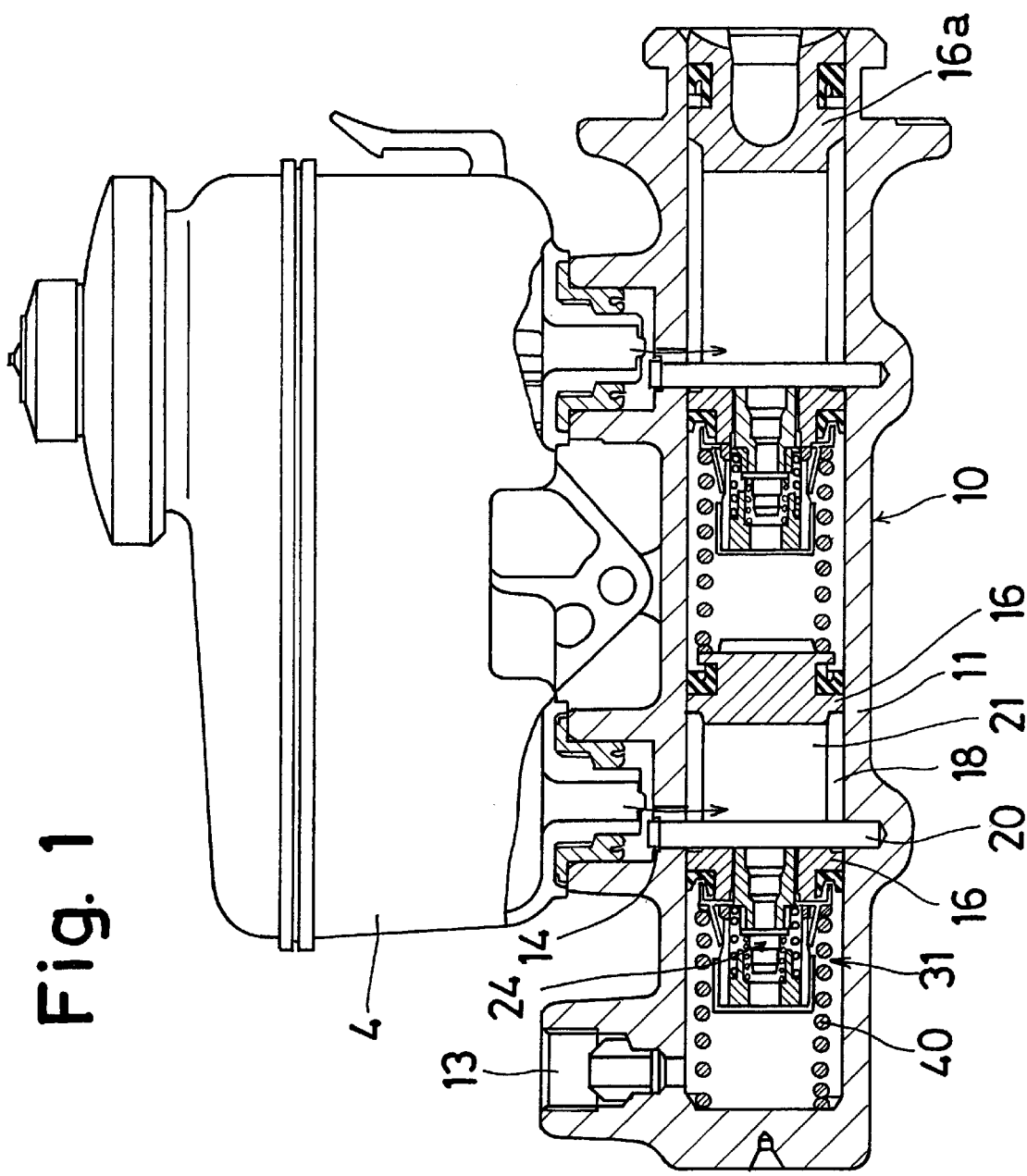
FIG. 1 is a cross-sectional view of a master cylinder in accordance with a first embodiment of the present invention.
Figure 2:
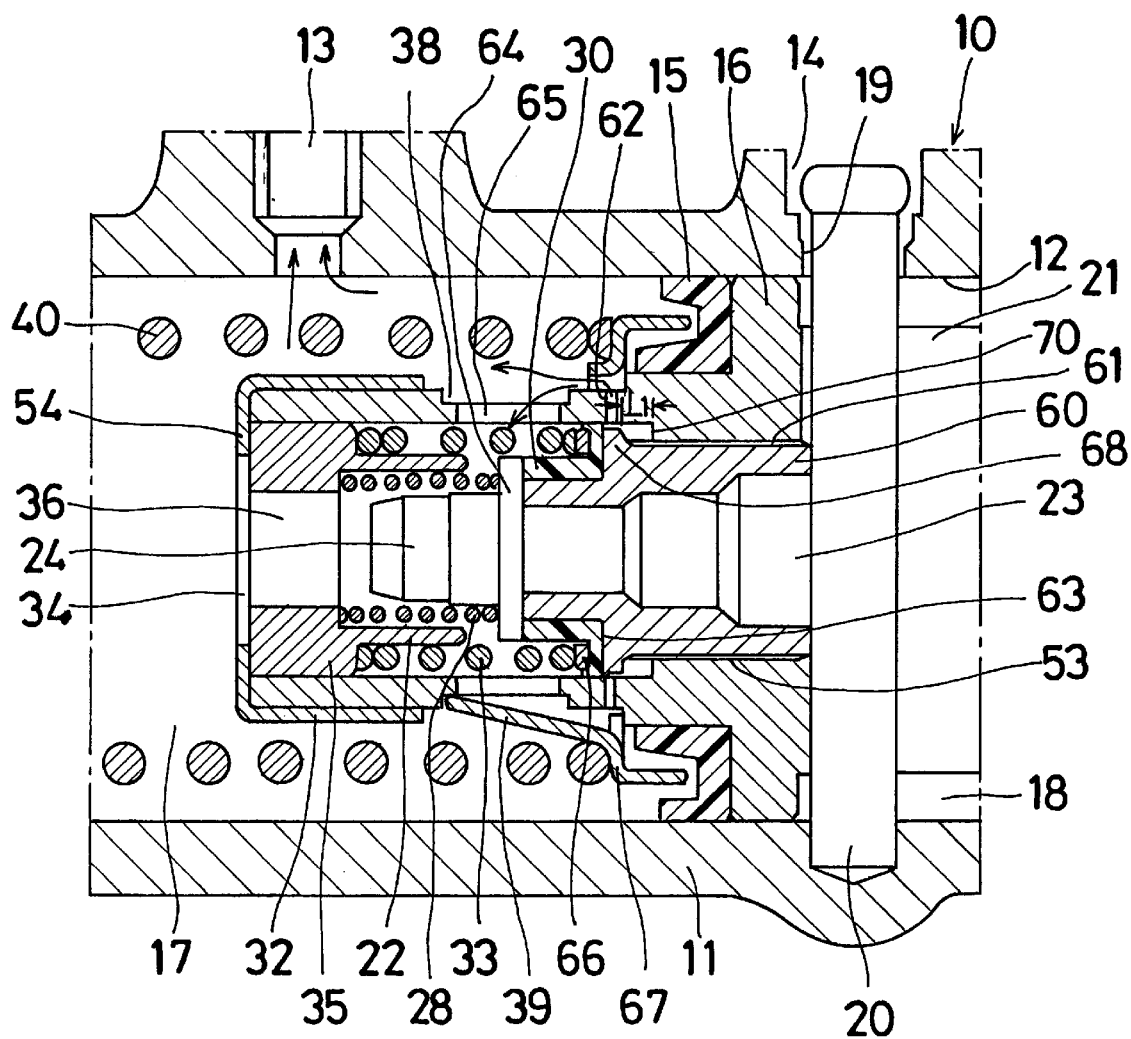
FIG. 2 is an enlarged cross sectional view of the valve mechanism used in the master cylinder shown in FIG. 1.

With reference initially to FIGS. 1 and 2, the master cylinder in accordance with one embodiment of the present invention includes a generally cylindrical body 11. The body 11 is provided with a cylindrical bore 12, an output port 13 which communicates with an external oil pressure circuit capable of performing fluid pressure control such as traction control, and a reservoir connecting port 14 which communicates with a reservoir 4. The output port 13 and the reservoir connecting port 14 communicate with the cylindrical bore 12.

Two pistons 16, 16a are located within the cylindrical bore 12 and each piston is provided with a valve mechanism 31 such that brake fluid is supplied from the master cylinder 10 shown in FIG. 1 to the front wheel and rear wheels of a vehicle. The valve mechanism associated with each of the pistons 16, 16a is generally the same and so the structure of only one valve mechanism 31 will be described below, it being understood that the structure of the other valve mechanism is generally the same.

The piston 16 is disposed in the inner portion of the cylindrical bore 12 with an annular cup seal 15 being provided to effect a liquid tight seal. The piston 16 is adapted to freely move axially forward and backward along the longitudinal extent of the cylindrical bore 12. The piston 16 is arranged within the cylindrical bore 12 to define a pressure generating chamber 17 (hereinafter referred to as a pressure chamber) on one side that is capable of increasing the pressure of the brake fluid and a supply chamber 18 on the opposite side. The supply chamber 18 communicates with the reservoir 4 through the reservoir connecting port 14 by way of a radially directed communicating hole 19 that is formed in the body 11.

An axially extending slit 21 is formed in the piston 16 and a pin 20 secured at both ends to the body 11 extends through the slit 21. The piston 16 is able to freely move in the forward and backward directions within the bore 12 as the pin 20 is located within the slit 21. The piston 16 has an axially extending opening portion 53 that is open at opposite ends. A rod 60 is coaxially positioned within the opening portion 53 in the piston 16 and is movable within the opening portion 53.

The rod 60 is outfitted with an axially extending hole 23 that is open at both ends and that possesses a stepped configuration. The stepped configuration of the hole 23 is such that the inner diameter of the hole 23 at the end closest to the pin 20 is larger than at the opposite end of the hole 23. The motion of the rod 60 (as well as the piston 16) in one direction (i.e., the rightward direction as seen with reference to FIG., 2) is restricted by the pin 20. Also, the piston 16 and the rod 60 are configured and arranged such that once the piston 16 moves a predetermined distance L1 (see FIG. 2) in the leftward direction, the rod 60 moves in an interlocking manner with the piston 16. That is, the piston 16 and the rod 60 move together as a unit.

With the rod 60 positioned within the piston 16, a flow passage 61 is formed between the inner surface of the opening portion 53 of the piston 16 and the outer periphery of the rod 60. Brake fluid is thus able to communicate with or flow into the pressure chamber 17 through the reservoir connecting port 14, the supply chamber 18, the fluid passage 61 and a radially oriented communicating hole 62 provided in the piston 16. Brake fluid in the pressure chamber 17 is able to communicate with or flow into the output port 13 that is connected to the oil pressure circuit. Further, a communicating hole 65 is provided in the middle of the piston 16 at a position close to the front end of the rod 60 (i.e., the left end of the rod 60 as seen with reference to FIG. 2). This communicating hole 65 extends in the vertical or radial direction.

The outer peripheral portion of the front end of the rod 60 is provided with a step portion 63, and a seal member 30 is seated on this step portion 63. The seal member 30, which has a substantially L-shaped cross section and is preferably made of rubber, covers the step portion 63, thereby securely sealing brake fluid passing through the fluid passage 61 from the supply chamber 18.

The valve mechanism 31 serving as a check valve is defined by a valve body 24, the seal member 30 and an opening portion (seat surface) at the front end of the rod 60. The valve body 24 has a flange portion 64 that closes the opening portion (seat surface) at the front end of the rod 60 by virtue of the urging force associated with a first spring 28. The valve mechanism 31 is arranged in the inner portion of the piston 16 on the axis of the piston 16. That is, the valve mechanism 31 is coaxially arranged with respect to and within the piston 16.

One end of the first spring 28 is supported on the flange portion 64 of the valve body 24 while the opposite end of the spring 28 bears against a spring retainer 35 located within the rod 60. One end of the spring retainer 35 is provided with an annular guide wall 22 that extends axially towards the rod 60. The first spring 28 is located within the annular guide wall 22. The spring retainer 35 also supports one end of a second spring 33, with the opposite end of the second spring 33 bearing against a washer 66 located against the seal member 30. The second spring 33 is located outside the annular guide wall 22. The motion of the seal member 30 disposed in the step portion 63 of the rod 60 is thus restricted through the washer 66.

The spring retainer 35 is press-fitted in the open forward end of the piston 16 as seen in FIG. 2. In addition, a retainer 32 covers the outer periphery of the piston end portion 54 and prevents the spring retainer 35 from moving axially beyond the front end face of the piston 16. The central portion 34 of the axial end of the retainer 32 is provided with an opening and the axially extending portion of the retainer 32 is provided with a plurality of holes.

The retainer 32 includes a hook portion 39 that engages a step portion 38 on the outer periphery of the piston 16. Thus, the piston 16, the spring retainer 35, the valve body 24 and the rod 60 are united.

Further, the retainer 32 is provided with a receive portion 67 that receives the end of a return spring 40, with the opposite end of the return spring bearing against the end wall of the cylindrical portion 12. The piston 16 is urged by the return spring 40 to assume a non-operating position which is shown in FIG. 2. The pin 20 performs the function of defining a non-operating position of the piston 16 urged in the backward direction (i.e., to the right as seen with reference to FIG. 2) by the return spring 40.

The valve body 24 is designed to drive a pump 50 (see FIG. 3) in accordance with traction control operation at a time when the master cylinder 10 is in a non-operating state. When brake fluid is sucked or drawn out from the output port 13 so as to produce a negative pressure condition in the master cylinder, the valve body 24 moves in the leftward direction as seen with reference to FIG. 2 until the flange portion 64 of the valve body 24 is brought into contact with the end face of the annular guide wall 22 against the urging force of the spring 28. As a result, the flange portion 64 is spaced apart from the valve seat formed by the open end of the rod 60 together with the seal member 30 and brake fluid in the axial hole 23 is communicated with and flows into the pressure chamber 17 so that a sufficient amount of brake fluid can be sucked from or drawn out of the reservoir 4. In this situation, the valve body 24 allows the brake fluid to flow in only one direction, thereby serving as a check valve. Because the valve body 24 is provided on the axis of the piston 16 (i.e., is coaxial with the piston 16), the operation can be rather easily performed through use of a relatively simple structure.

The operation of the master cylinder 10 is as follows. FIG. 1 shows a non-operating state (a returned state) of the master cylinder 10. In this state, the piston 16 is in contact with the pin 20 against which bears the end portion of the rod 60 closest to the supply chamber. The flow of brake fluid in the axial hole 23 is thus shut off or prevented because the valve body 24 is seated by the urging force of the spring 28 so as to be in a closed state. However, the reservoir connecting port 14 and the pressure chamber 17 are in a communicating state with one another by virtue of the flow passage 61 and the communicating hole 62. When the brake pedal 2 is depressed from this state, the piston 16 moves axially in a direction to compress the pressure chamber. The rod 60 remains in contact with the pin 20 that is fixed to the body 11 as the piston 16 moves over a distance equal to or less than the predetermined distance L1. As the piston 16 moves, the communicating hole 62 of the piston 16 is closed by the seal member 30 that is mounted on the rod 60 and so the pressure chamber 17 is shut off from the reservoir 4. In this state, the axial hole 23 and the pressure chamber 17 are securely closed off from one another because the valve body 24 is in the closed state.

Then, as the brake pedal 2 is further depressed, a step portion 70 provided on the inner diameter surface of the piston 16 is brought into contact with a flange portion 68 formed on the outer periphery of the rod 60. At this time, the piston 16 and the rod 60 are integrally moved against the urging force of the return spring 40. Accordingly, the volume of the pressure chamber 17 is reduced, and brake fluid having an increased pressure in the pressure chamber 17 is discharged from the outlet port 13.

Figure 3:
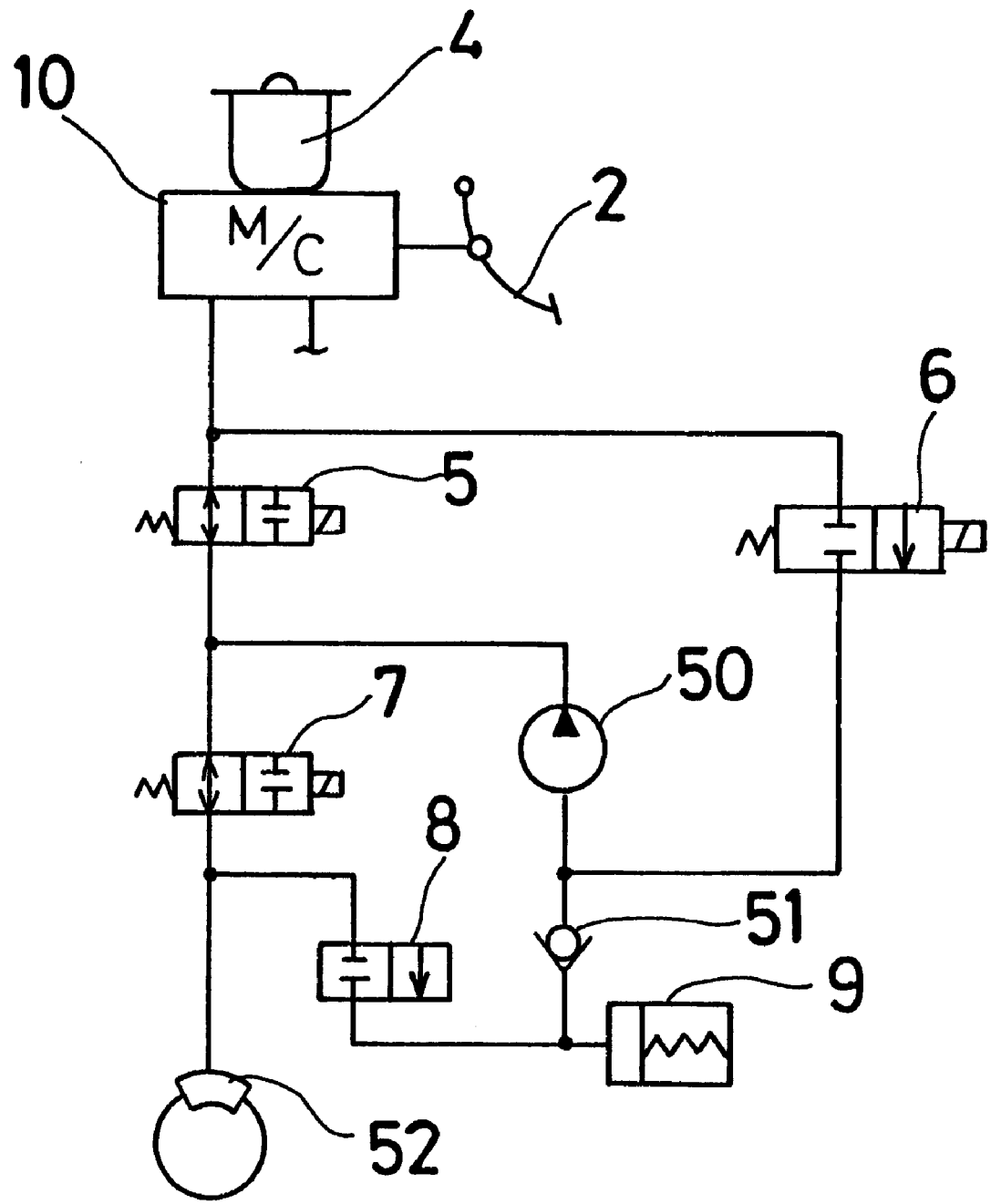
FIG. 3 is a schematic illustration of an oil pressure circuit including the master cylinder in accordance with an embodiment of the present invention for effecting fluid pressure control.

The application of the master cylinder 10 to an oil pressure circuit for controlling braking will be described with reference to FIG. 3. In this arrangement, brake fluid is supplied to each of the wheels, although the state of only one wheel will be described for purposes of simplification.

A wheel cylinder 52 provided at one of the wheels of a vehicle is designed so that the pressure thereof is increased by the master cylinder 10 in accordance with depression of the brake pedal 2 so that braking is effected. A reservoir 4 for storing brake fluid is provided on the master cylinder 10. A normally open switch valve 5 and a normally open control valve 7 are provided in the passage that connects the master cylinder 10 to the wheel cylinder 52 for controlling the flow passage between the master cylinder 10 and the wheel cylinder 52. Further, a normally closed control valve 8 for reducing the brake pressure applied to the wheel cylinder 52 is provided in a passage extending between the reservoir 9 and a passage that connects the valve 7 to the wheel cylinder 52. A check valve 51 is located between the suction port of the pump 50 and the reservoir 9 for allowing flow from the reservoir 9 to the pump and for preventing flow in the opposite direction. The discharge port of the pump 50 is connected to a passage extending between the switch valve 5 and the control valve 7. A normally closed switch valve 6 is connected to a passage extending between the pump 50 and the check valve 51 for supplying brake fluid from the master cylinder 10 to the suction port of the pump 50.

In the case of increasing the pressure in the wheel cylinder 52 at the time traction control is performed, the switch valve 5 and the switch valve 6 are turned on (turned on electrically) to cut off communication between the master cylinder 10 and the wheel cylinder 52 while communicating the reservoir 4 and the pump 50 with each other through the master cylinder 10. Also, the pump 50 is driven to supply brake pressure. In contrast, to reduce the pressure in the wheel cylinder 52, the control valves 7, 8 are turned on so that brake pressure in the wheel cylinder 52 escapes to the reservoir 9. In this case, the brake fluid within the reservoir is sucked up or drawn in by the pump 50.

In a situation where an anti-skid control is started immediately after a sufficient amount of brake fluid has been supplied to the wheel cylinder by increasing the pressure of the wheel cylinder 52 at a time of performing traction control on a low friction road surface, thereby reducing the pressure, the brake fluid escaped to the reservoir 9 returns to the master cylinder 10 by the pump 50. At this time, in the conventional system, a galling phenomenon is generated in which the high pressure brake fluid supplied to the wheel cylinder for performing traction control from the seal member shutting the pressure chamber and the supply chamber is returned to the low pressure reservoir in the middle of the process of returning to the supply chamber and the reservoir from the pressure chamber. However, in the master cylinder 10 of this embodiment, because the pressure applied to the seal member 30 when the supply chamber 18 and the pressure chamber 17 are communicated with each other in the middle of the process during which the piston 16 returns to the non-operating position is made equal, this galling phenomenon in the seal portion is prevented.

Figure 4:
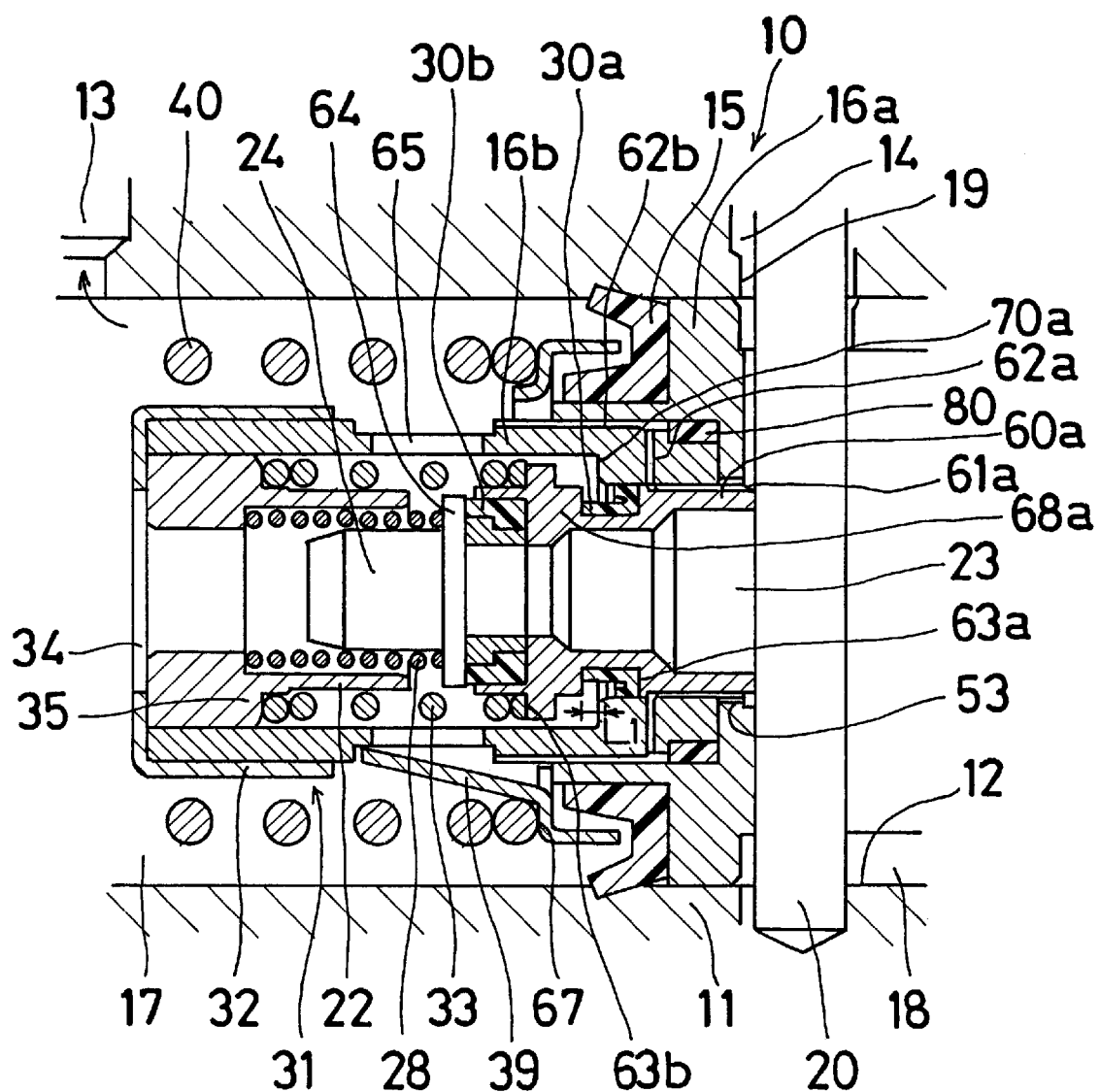
FIG. 4 is a cross-sectional view of a master cylinder in accordance with a second embodiment of the present invention.
Figure 5:
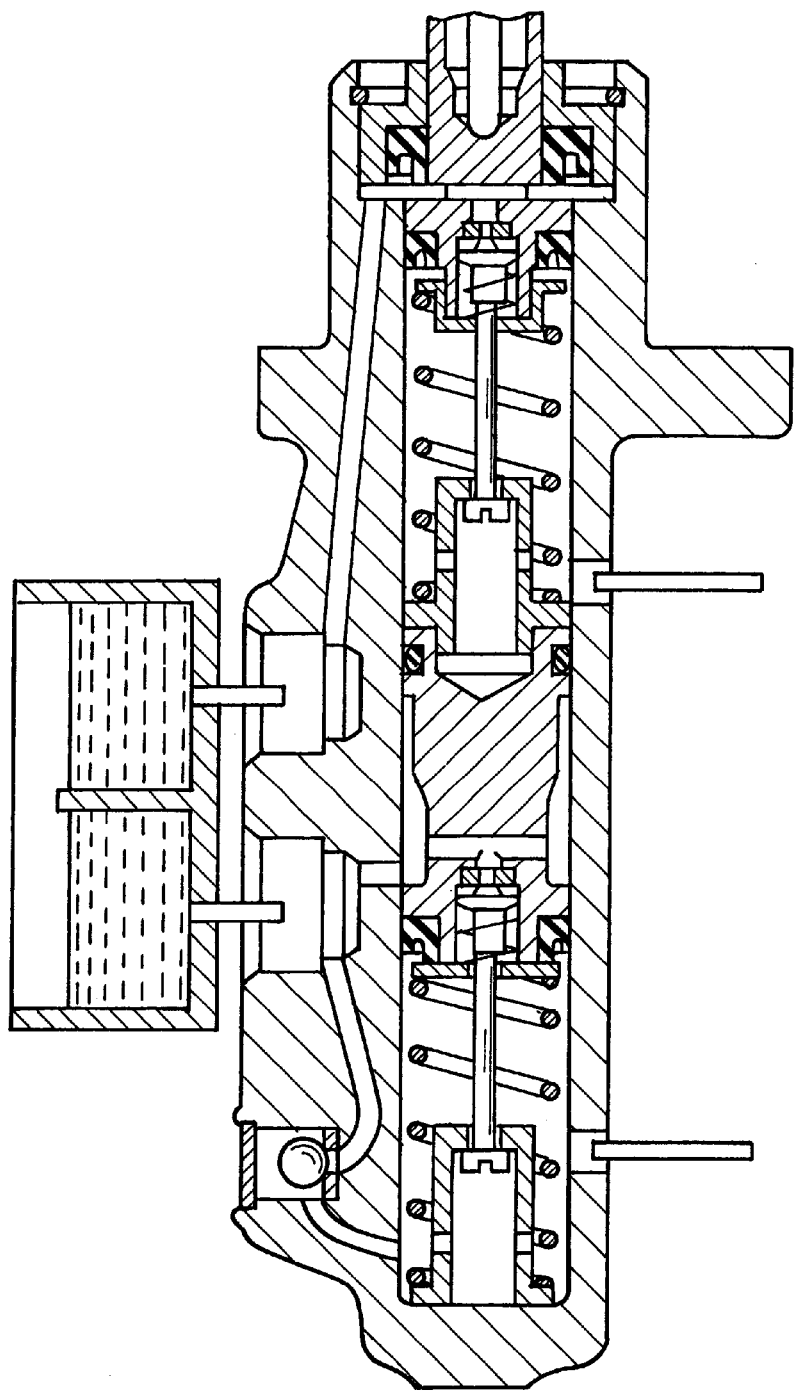
FIG. 5 is a cross-sectional view of a known master cylinder.

A second embodiment of the master cylinder according to the present invention will be described with reference to FIG. 4. The following description focuses mainly on the differences between this embodiment and the first embodiment described above. In this second embodiment, the front end portion of the piston 16 is separated into two parts so that the piston is constituted by first and second piston parts 16a, 16b. With the rod 60a positioned within the piston, a flow passage 61a is formed between the inner diameter surface of the piston and the outer peripheral surface of the rod 60a. This flow passage extends to a space formed between the rod 60a and the second piston part 16b. A radially extending communicating hole 62a is provided in the second piston part 16b and an axially extending communicating hole 62b is formed between the first and second piston parts 16a, 16b. Accordingly, brake fluid from the reservoir 4 communicates with or flows into the pressure chamber 17 through the reservoir connecting port 14, the supply chamber 18, the flow passage 61a, the communicating holes 62a, 62b. Thereafter, the brake fluid communicates with or flows into the output port 13 connected to the external oil pressure circuit.

A vertically or radially extending communicating hole 65 is provided in the intermediate portion of the first piston part 16b at a location close to the front end of the rod 60a. Further, to maintain the sealing capability of the piston parts 16a, 16b, an annular seal member 80 is provided close to the position at which the communicating passages 62a, 62b intersect.

A step portion 63a is formed on the outer surface of the rod 60a. A seal member 30a having a substantially L-shaped annular cross section and preferably made of a rubber material is seated in the step portion 63a, thereby securely sealing brake fluid passing through the flow passage 61a from the supply chamber 21. Further, a recess is formed in the front axial interior end surface of the rod 60 and an annular seal member 30b is fitted in the recess.

The valve body 24 having a flange 64 is arranged coaxially with the piston 16b. The valve body 24 is urged towards the seal member by the spring 28 to close the seat surface formed by the seal member 30b.

One end of the spring 28 is supported on the flange 64 of the valve body 24 and the opposite end of the spring abuts against the spring retainer 35. The spring retainer 35 includes an axially extending annular guide wall 22. The spring retainer 35 also guides and supports one end of the spring 33, with the opposite end of the spring 33 engaging an outer step portion 63b that is formed on the rod 60a.

The spring retainer 35 is press-fitted in the open forward end of the second piston part 16b. In addition, the retainer 32 covers the outer periphery of the end portion of the second piston part 16b and prevents the spring retainer 35 from moving axially beyond the front end face of the second piston part 16b. The central portion 34 of the axial end of the retainer 32 is provided with an opening and the axially extending portion of the retainer 32 is provided with a plurality of holes. The retainer 32 includes the hook portion 39 that engages the step portion on the outer periphery of the second piston part 16b. Thus, the second piston part 16b, the spring retainer 35, the valve body 24 and the rod 60a are united.

The retainer 32 is provided with the receive portion 67 that receives the end of the return spring 40. The opposite end of the return spring 40 bears against the end wall of the cylindrical portion 12. The piston 16 is urged by the return spring 40 to assume a non-operating position.

In the same manner as in the first embodiment, the valve body 24 drives the pump 50 in accordance with a traction control operation at a time when the master cylinder 10 is in a non-operating state. When brake fluid is drawn out through the output port 13 to produce a negative pressure condition, the flange portion 64 of the valve body 24 moves in the leftward direction shown in FIG. 4 until the flange portion 64 contacts the end face of the annular guide wall 22. The flange portion 64, which closes the valve seat defined by the open end of the rod 60a by way of the seal member 30b, thus becomes spaced apart from the valve seat, and the brake fluid present in the axial hole 23 is communicated with or flows into the pressure chamber 17 so that a sufficient amount of brake fluid can be sucked from or drawn out of the reservoir 4.

Because the seal member 30b which seals the supply chamber 18 and the pressure chamber 17 in the valve seat portion of the valve body 24 closing the axial hole 23, and the seal member 30a which seals the supply chamber 18 and the pressure chamber 17 in the portion of the flow passage 61a are separately arranged, a secure and stable sealing can be achieved.

In accordance with the present invention, because the check valve is structured in the manner described above and is provided in the inner portion on the axis of the cylinder, the check valve is advantageously opened so that the supply chamber and the pressure generating chamber are communicated with each other only in the case that the pressure generating chamber is under a negative pressure condition when the piston is in the non-operating state. Accordingly, in case brake fluid is required during fluid pressure control, the brake fluid in the reservoir can be sucked or drawn from the check valve. In this case, because the check valve is provided in the inner portion on the axis of the cylinder, advantageous use of space is made. The master cylinder size is thus not increased and the associated cost is also not increased.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A master cylinder comprising:
    a piston disposed in a cylindrical bore formed in a body for moving freely in forward and rearward directions;
    a pressure generating chamber and a supply chamber formed in the body, the pressure generating chamber being separated from the supply chamber by the piston, the pressure generating chamber communicating with an output port and the supply chamber communicating with a reservoir storing brake fluid;
    said piston discharging brake fluid of increased pressure in said pressure generating chamber to said output port upon operation of said piston, and said piston being returned to a non-operating position by a return spring arranged within said pressure generating chamber;
    said piston having an opening portion communicating said supply chamber with said pressure generating chamber, said piston having an axis;
    a rod positioned within said opening portion, said rod including an axially extending hole;

said supply chamber and said pressure generating chamber being communicated by a flow passage formed between an inner periphery of the opening portion of said piston and an outer periphery of said rod when said piston is positioned in the non-operating position;

said flow passage being closed by a seal member arranged on the outer periphery of said rod when said piston moves a predetermined distance; and a check valve positioned within said piston along the axis of the piston for communicating said supply chamber with said pressure generating chamber only when said piston is in the non-operating position and said pressure generating chamber is under negative pressure.

2. The master cylinder according to claim 1, wherein said rod includes one end portion having an outer surface that possesses a stepped configuration.

3. The master cylinder according to claim 2, wherein said seal member is mounted on the rod at the end portion having the stepped configuration.

4. The master cylinder according to claim 1, wherein said piston includes axially spaced apart communicating holes.

5. The master cylinder according to claim 1, wherein said check valve includes a valve body provided with a flange portion and a first spring which applies an urging force to said valve body to urge said flange portion into contacting engagement with an end of said rod when said piston is in the non-operating position.

6. The master cylinder according to claim 5, including a spring retainer positioned within the piston, one end of the first spring which applies an urging force to said valve body being engaged with the spring retainer and an opposite end of the first spring being engaged with the flange portion.

7. The master cylinder according to claim 6, including a second spring for urging the rod away from the spring retainer, said second spring being positioned within the piston with one end of the second spring being engaged with the spring retainer.

8. The master cylinder according to claim 7, including a retainer member positioned on an end face of said piston for retaining said spring retainer within the piston.

9. The master cylinder according to claim 1, wherein said piston includes two piston parts.

10. A master cylinder comprising:

a body having a bore in which is positioned an axially movable piston to form a pressure generating chamber on one side of the piston and a supply chamber on an opposite side of piston, the pressure generating chamber being in communication with an output port formed in the body and the supply chamber being in communication with a reservoir storing brake fluid;

a return spring operatively associated with said piston for applying an urging force to the piston for normally urging said piston to a non-operating position, the piston being axially movable against the normal urging force of the return spring to an operating position in which brake fluid of increased pressure in said pressure generating chamber is output to said output port;

a check valve positioned within said piston for permitting communication between said supply chamber and said pressure generating chamber only when said piston is in the non-operating position and said pressure generating chamber is under negative pressure; and an axially movable rod positioned within the piston, said supply chamber and said pressure generating chamber being communicated by a flow passage formed between said piston and said rod when said piston is positioned in the non-operating position.

11. The master cylinder according to claim 10, including a seal member arranged on an outer periphery of said rod to close said flow passage when said piston moves a predetermined distance.

12. The master cylinder according to claim 11, wherein said rod includes one end portion having an outer surface that possesses a stepped configuration, said seal member being mounted on the rod at the end portion having the stepped configuration.

13. A master cylinder comprising:

a body having a bore in which is positioned an axially movable piston to form a pressure generating chamber on one side of the piston and a supply chamber on an opposite side of piston, the pressure generating chamber being in communication with an output port formed in the body and the supply chamber being in communication with a reservoir storing brake fluid;

a return spring operatively associated with said piston for applying an urging force to the piston for normally urging said piston to a non-operating position, the piston being axially movable against the normal urging force of the return spring to an operating position in which brake fluid of increased pressure in said pressure generating chamber is output to said output port;

a check valve positioned within said piston for permitting communication between said supply chamber and said pressure generating chamber only when said piston is in the non-operating position and said pressure generating chamber is under negative pressure; and a rod movably positioned within said piston, said rod including an axially extending hole, the communication of said supply chamber with said pressure generating chamber only when said piston is in the non-operating position and said pressure generating chamber is under negative pressure occurring by way of said hole in said rod.

14. The master cylinder according to claim 13, wherein said check valve includes a valve body provided with a flange portion and a first spring which applies an urging force to said valve body to urge said flange portion into contacting engagement with an end of said rod when said piston is in the non-operating position.

15. The master cylinder according to claim 14, including a spring retainer positioned within the piston, one end of the first spring which applies an urging force to said valve body being engaged with the spring retainer and an opposite end of the first spring being engaged with the flange portion.

16. The master cylinder according to claim 15, including a second spring for urging the rod away from the spring retainer, said second spring being positioned within the piston with one end of the second spring being engaged with the spring retainer.

17. The master cylinder according to claim 16, including a retainer member positioned on an end face of said piston for retaining said spring retainer within the piston.

18. The master cylinder according to claim 10, wherein said piston includes two piston parts.

19. A master cylinder comprising:

a body having a bore in which is positioned an axially movable piston to form a pressure generating chamber on one side of the piston and a supply chamber on an opposite side of piston, the pressure generating chamber being in communication with an output port formed in the body and the supply chamber being in communication with a reservoir storing brake fluid;

a return spring operatively associated with said piston for applying an urging force to the piston for normally urging said piston to a non-operating position, the piston being axially movable against the normal urging force of the return spring to an operating position in which brake fluid of increased pressure in said pressure generating chamber is output to said output port;

an axially movable rod positioned within said piston, said rod including an axially extending hole;

a flow passage for communicating the pressure generating chamber with the supply chamber when the piston is in the non-operating position;

an axially movable valve body positioned within the piston; and a spring member for normally urging the valve body towards the rod to close the hole in the rod, the valve body being movable away from the rod to open the hole in the rod and permit communication between the supply chamber and the pressure generating chamber by way of the hole in the rod only when said piston is in the non-operating position and said pressure generating chamber is under negative pressure.

* * * * *